United States Patent [19]

Moore, Jr.

[11] 4,097,419

[45] Jun. 27, 1978

[54] PROCESS FOR STABILIZED HIGH STRENGTH UREA-ALDEHYDE POLYMERS

[75] Inventor: William Percy Moore, Jr., Hopewell, Va.

[73] Assignee: Waverly Chemical Co., Hopewell, Va.

[21] Appl. No.: 836,492

[22] Filed: Sep. 26, 1977

[51] Int. Cl.$^2$ ............................. C08J 9/30; C08J 9/12
[52] U.S. Cl. .............................. 260/2.5 F; 260/70 R; 260/71; 260/849; 260/17.3; 264/109
[58] Field of Search ....................................... 260/2.5 F

[56] References Cited

U.S. PATENT DOCUMENTS

| 255,989 | 7/1951 | Meyer | 260/2.5 F |
|---|---|---|---|
| 3,256,067 | 6/1966 | Schriver et al. | 260/2.5 F |
| 3,377,139 | 4/1968 | MacGregor et al. | 260/2.5 F |
| 3,979,341 | 9/1976 | Widmann | 260/2.5 F |

*Primary Examiner*—Thomas De Benedictis, Sr.

[57] ABSTRACT

A process for producing stable urea-aldehyde polymers with high structural strength from two storable liquid ingredients. In this process, partially cured liquid urea-formaldehyde resin is reacted with an aqueous cross-linking solution comprising one or more alkyl or aryl dialdehydes containing two to eight molecular carbons and the hydrogen ion concentration needed to catalyze the completion of the reaction of the dialdehydes and the urea-formaldehyde. The process for producing urea-aldehyde polymers, having improved structural strength and reduced aldehyde vapor emission during their production and prolonged use, is especially effective for manufacturing products for the building industry, such as urea-aldehyde insulating foam, wood-filled particle board, and plywood. The increased polymer strength and the elimination of the hazardous and objectionable aldehyde odor is achieved by maintaining the molecular ratio of total aldehyde moieties to urea to about 1.8 and the molecular ratio of the aldehyde moieties in the dialdehydes to those in formaldehyde at about 0.2. The process requires that the dialdehydes be substantially contained in the cross-linking solution for system storability and long term reactivity. The hydrogen ion concentration required in the cross-linking solution is represented by a pH of about 3 and may be achieved by addition of water soluble acid or by heating the mixture and converting some aldehydes to acids.

4 Claims, No Drawings

PROCESS FOR STABILIZED HIGH STRENGTH UREA-ALDEHYDE POLYMERS

BACKGROUND OF THE INVENTION

This invention relates to urea-aldehyde polymers and more particularly to a process for producing polymers, having properties of high structural strength and low residual aldehyde vapor, by the reaction of two storable solutions comprising partially cured aqueous urea-formaldehyde resin and aqueous dialdehyde cross-linking solution. The process for producing the new polymers is particularly useful in the manufacture of high strength, low odor, urea-aldehyde insulating foam, and high strength, low odor particle board and plywood.

The building industry consumes large amounts of urea-formaldehyde polymers in the manufacture of structural, decorative, and insulating boards, and in lightweight insulating foam. Urea-formaldehyde polymers have been particularly important because they may be formed and cured in relatively simple and economical procedures, and because they may be combined with other low cost materials, particularly cellulosic fibers and wood, to form composites which are economically useful building materials.

Urea-formaldehyde polymers developed to date have not had the structural strength required to produce an effective foam insulation or composite structural board, which would not generate objectionable and unhealthy amounts of formaldehyde vapor during the formation and service life of the products. Copending U.S. application 761,321, now abandoned, by this inventor, disclosed improvement in the chemical stability of urea-formaldehyde foam by reaction of 1–5% of dialdehydes, containing two to six molecular carbons, and additional urea, in the preparation of a partially cured resin for use in insulating foam manufacture. Although the said disclosure represented an advance in the art of producing insulating foams having properties of long term stability, it did not provide a process for the production of polymers with added structural strength required to provide load bearing properties or stiffness to building structural members. Some such structural members used for building include core fillings for thin-skin wall panels or door cores. More conventional structural uses include resin-filled chip or cellulose fiber panels. Further, the said disclosure did not provide a system in which the ingredient liquids are storable for practical periods of time nor a system which could be practically applied to the manufacture of composite boards and plywood. The partially cured resin containing one to five per cent dialdehyde and added free urea must be used within a few days of its manufacture, to prevent the precipitation of an insoluble glyoxal-urea-urea-formaldehyde copolymer and deactivation of the partially cured resin.

Because of the realization of possible hazards from the continued evolution of formaldehyde from particle boards, plywood, and insulating foams, and interest by governmental regulatory agencies, there has been considerable evidence of progress in the art. Kawashima in Japanese patent No. 74, 71,118 discloses the use of large amounts of calcium lignosulfonate to reduce free formaldehyde in luan plywood. The presence of large amounts of base-forming materials such as calcium, sodium, potassium, ammonia, or urea does reduce initial free formaldehyde content of the product but weakens rather than strengthens the final product Dashkovskaya et al in USSR patent No. 480,555, Aug. 15, 1975 disclose that the addition of mineral oil containing sodium silicate reduced formaldehye odor in particle board as produced. However, sodium silicate after heating and drying gives a basic reaction, so that repeated moistening and drying of the particle board in structural service will degrade and not strengthen the urea-formaldehyde polymer.

It is therefore a primary object of this invention to provide a process for producing from two storable liquids stable urea-aldehyde polymers having the structural strength required for use in structural members for the building industry.

It is another object of this invention to provide a process for producing urea-aldehyde polymers having high structural strength with the elimination of objectionable formaldehyde vapor emission during the polymer service life.

It is another object of this invention to provide a process for producing urea-aldehyde polymers from a partially cured urea-formaldehyde resin solution and a cross-linking solution, both said solutions having commercially acceptable storage life properties.

It is another object of this invention to provide a process for producing urea-aldehyde insulating foams having properties of increased structural strength and decreased formaldehyde vapor emission.

It is another object of this invention to provide a process for producing urea-aldehyde polymer-filled particle board having properties of increased structural strength and decreased formaldehyde vapor emission during the formation and service life of the board.

It is another object of this invention to provide a process for producing thin-skin foam filled building panels suitable for use in commercial construction applications.

These and other objects will be evident from the following description of the invention.

SUMMARY OF THE INVENTION

It has now been discovered that the foregoing objects can be accomplished, and stable urea-aldehyde polymers produced, having properties of increased structural strength and decreased formaldehyde odor emission, by a process for the reaction of separately stored solutions of partially cured urea-formaldehyde resin and of cross-linking agent, comprisng one or more alkyl or aryl dialdehydes containing two to eight molecular carbons, as catalyzed by increased hydrogen ion concentrations represented by pH between 2 and 5. Surprisingly, the high ratio of aldehyde moieties to urea which are required to produce polymers having high structural strength may be used without the hazard from objectionable aldehyde vapor, during the formation and service life of the polymer, when twenty per cent of the total aldehyde moieties are present as alkyl or aryl dialdehydes having two to eight molecular carbons and the said dialdehydes are provided as a cross-linking solution at the time of the final polymer formation and cure.

The term aldehyde moiety is used in this disclosure to mean a carbonyl group functioning chemically as an aldehyde. A molecule of glyoxal contains two aldehyde moieties and a molecule of formaldehyde contains only one. The term cross-linking solution is used herein to denote a solution of dialdehyde which has two aldehyde moieties and which can react with partially cured urea-formaldehyde resin, urea, and formaldehyde to link them into longer chain molecules through the dialdehyde acting as a bridge.

DESCRIPTION OF THE INVENTION

A process has been discovered for the reaction of separately stored solutions of partially cured urea-formaldehyde resin and cross-linkingagent which produces polymers having structural strength suitable for use in the building industry and which surprisingly, may be used in a practical manner without the hazard from objectionable vapor. The polymers produced by the process of this invention may be used in a variety of uses for which urea-aldehyde polymers are normally applied where long term strength and low odor are required, particularly for the manufacture of urea-aldehyde insulating foams, and resin filled particle board and plywood. The polymers produced by the process of this invention may be used with or without the addition of fillers, such as colloidal silica, bagasse, attapulgite clay, wood chips, wood fiber, cellulose products or lignin. To achieve the structural strength and low aldehyde vapor emission from the urea-aldehyde, the process I have discovered must be closely and accurately followed.

The cross-linking solution must contain water soluble alkyl or aryl dialdehydes containing two to eight molecular carbons. Glyoxal is the most economical and most reactive of the dialdehydes and is generally preferred for most urea-aldehyde polymers. The dialdehydes with longer skeletal chains such as suberic aldehyde impart additional flexibility to the cured products.

It is critical that the dialdehydes used for cross-linking and strengthening the urea-aldehyde polymers be stored separate from the partially cured urea-formaldehyde resin until cure of the polymer is initiated by acid catalysis. The presence of appreciable amounts of the dialdehydes in the partially cured urea-formaldehyde resin results in reaction of the dialdehyde with the urea-formaldehyde resin which within several days causes precipitation and deactivation of the resin.

For satisfactory performance of the process, it is necessary that the molecular ratio of aldehyde moieties to formaldehyde in the polymer be controlled between 0.1 and 1.0, and preferably between 0.2 and 0.4. When the aldehyde moieties from dialdehyde were lower than 0.1 the formaldehyde vapor emission from polymers was excessive, and the structural strength was reduced significantly where polymers contained appreciably more than 0.4 aldehyde moieties per mol of formaldehyde.

Increased urea-aldehyde structural strength was found at total aldehyde moieties to urea molecular ratios of between 1.6 and 2.2, and maximum structural strength was found between the ratios of 1.7 and 2.0.

The polymer cure must be catalyzed by acid conditions in the pH range between 2 and 5. The acidity for the polymer cure may be derived from organic or mineral acids such as formic, phosphoric, or sulfuric acids added to the cross-linking agent, which may also contain a surfactant, for example, in the production of urea-aldehyde insulating foam. The acidity for the polymer cure may also be derived by heating the partially cured resin to form formic acid by the Cannizaro reaction, in the production of particle board. Where rapid in-situ cure at ambient temperature is desired, pH of polymer mixture should be brought to 2–3.

The properties of the partially cured urea-formaldehyde resin used in the process of this invention must be closely controlled to obtain a polymer with high structural strength and low aldehyde vapor emission. The said resin must have a total solids content in water amounting to 40 to 65 per cent and have a formaldehyde to urea mol ratio of 1.2 to 1.7. To achieve maximum strength with minimum free formaldehyde, I prefer the partially cured urea-formaldehyde resin to contain 45 to 52 total per cent solids and a formaldehyde to urea mol ratio of 1.3 to 1.5. The partially cured urea-formaldehyde resin may contain additives to modify the final product, so long as the additives do not interfere with the dialdehyde reaction. For example, polyhydroxy type humectants, such as dipropylene glycol, sorbitol or polyethylene glycol may be readily used in resins for foam production. Blended urea-formaldehyde and melamine-formaldehyde resins may also be used in the production of polymer-filled particle board.

The partially cured urea-formaldehyde resins found optimum for use with the dialdehyde cross-linking agents are cooked at 98° to 103° C at pH 5.4 to 5.6 until viscosity reaches 20 to 40 centistokes at 30° C and then neutralized to pH 7.2 to 7.6.

The concentration of the dialdehyde in the cross-linking solution is not critical to the formation of urea-aldehyde polymers with high structural strength and low free formaldehyde so long as the ratio of dialdehyde to formaldehyde and the ratio of total aldehyde moieties to urea are held in the critically important process ranges defined above. It is necessary to the process that the cross-linking and partially cured resin solutions be rapidly and completely blended so that the cured polymer has a constant molecular ratio throughout.

DESCRIPTION OF THE PREFERRED EMBODIMENTS

The following examples illustrate the effectiveness and limits of the new process for producing stable urea-aldehyde polymers having high structual strength, low odor, and long term storability of ingredients. All parts and percentages are by weight unless otherwise specified.

EXAMPLE 1

A partially cured aqueous-urea-formaldehyde resin was prepared by adding at ambient temperature to a closed, stirred, jacketed, stainless steel reactor, fitted with internal cooling coils, the following ingredients: 5062 parts water, 6680 parts prilled urea (46% N, coated with trace of formaldehyde), 1850 parts 70% aqueous sorbitol, and 13875 parts 50% aqueous low buffer uninhibited formaldehyde.

The mixture was agitated vigorously and circulated through an external centrifugal pump and low pressure (7 psig) steam was applied to the jacket to increase temperature to 98° C at pH 7.2. When the temperature reached 98° C, 20% aqueous formic acid was added to decrease the pH in the clear solution to 5.3. Steam was removed from the jacket and cooling water was circulated through the internal coils ofthe reactor to hold the temperature to 103° C maximum. Temperature was then regulated by use of steam and cooling water as required. The pH was held in the range of 5.3 to 5.6 until a dilution cloud point test was obtained at 2.5 to 1 water dilution. When the desirwd partial cure of the urea-formaldehyde resin was indicated by the dilution test after 35 minutes at 98 to 103° C, maximum cooling was applied in the internal coils and temperature was decreased to 50° C. To the agitated clear solution at 60° C was added the following: 6360 parts water and 3598 parts prilled urea. Agitation was continued for 20 minutes while the still clear solution was cooled to ambient temperature by cooling water in the internal coils. The reaction mixture was then neutralized to pH 7.4 by the addition of triethanolamine. To the agitated neutralized partially cured resin was added the following: 1000 parts dipropylene glycol, 400 parts furfuryl alcohol, and 205 parts methanol. The partially cured urea-formaldehyde resin was then stored in drums for subsequent use. The mol ratio of formaldehyde to urea was 1.31 and calculated total solids content was 50.7%.

A cross-linking solution was prepared in polyethylene-lined drums with 55 gallons capacity by adding the following ingredients: 50 parts 40% aqueous glyoxal, 7.5 parts dibutyl naphthalene sulfonic acid, 5.5 parts orthophosphoric acid, 5.6 parts oxalic acid, and 497.0 parts of water. The ingredients were completely mixed and stored for subsequent use in producing foam.

The partially cured urea-formaldehyde resin and the aqueous cross-linking solutions were separately supplied continuously by diaphragm pumps to a commercial urea-formaldehyde foam machine where the cross-linking solution was converted to a froth by commingling with air in a glass tube 2 inches in diameter and 4 inches long, filled with glass beads ¼ inch in diameter. The partially cured urea-formaldehyde resin was added to the frothed cross-linking solution as a liquid through a ¼ inch inside diameter tube located in the center of the 2 inch tube where the frothed cross-linking solution is discharged from the frother to a 1 inch diameter by 6 feet long curing-application hose. The feed rates measured to the foam machine were as follows: air, 2.5 cubic feet per minute (at 25° C and 760 mm Hg absolute); cross-linking solution, 1.18 pounds per minute; and partially cured resin, 0.97 pounds per minute.

The blended foam left the curing-dispensing hose in a continuous stream and was used to form contiguous masses of urea-aldehyde insulation. Test cubes measuring 4 inches on each side were cut from the insulation mass within one minute of application and properties of these cubes determined when sampled and after they had completely dried. The molecular ratio of total aldehyde moieties to urea was 1.69 and the molecular ratio of glyoxal aldehyde moieties to formaldehyde was 0.246. Density of the wet foam cube was measured to be 2.35 pounds per cubic foot. The foam had the strength to support itself in 30 seconds and gained structural strength as it cured. The test cubes were stored under ambient room conditions and were weighed each day to determine dryness. After 10 days storage, weight was stable indicating the test cubes to be dry. Density of the test cubes was measured and found to be 0.65 pounds per cubic feet.

Structural strength of the test cubes was measured by placing a test cube on a platform scale, covering the cube with a 4 inch square steel plate and applying weight downwardly onto the plate and thus evenly to the surface of the cube. Weight was applied in increasing amounts until the cube lost its ability to support the force, and collapsed to 75% or less of its original volume. The exact weight required was then recorded. The weight recorded as the yield point for the foam was the average of the weight required for collapse on the three separate faces. There was little difference in the yield point of the three faces of the test cubes. The yield point was 2.6 pounds per square inch.

EXAMPLE 2

A series of foams was prepared by the method of example 1 using the partially cured urea-formaldehyde resin as example 1 and varying the glyoxal concentration in the cross-linking solution. The density of the foams produced were maintained about constant by controlling the amount of air supplied to the system, and the weight ratio of partially cured resin to cross-linking solution was maintained at about 0.9. Sample cubes were recovered from the contiguous masses of wet foam produced. These cubes were dried and tested for structural strength by the yield point method described in example 1. The results of these evaluations are listed as follows:

| Test No. | Dry Density lbs/ft$^3$ | Ratio Aldehyde Moieties to Urea Molecules | Ratio Aldehyde Moieties in Glyoxal to Aldehyde Moieties in Formaldehyde | Yield Point of Foam, lbs/In$^2$ | Comments |
|---|---|---|---|---|---|
| 1 | 0.68 | 1.48 | 0.0 | 0.7 | Soft, chalky |
| 2 | 0.65 | 1.70 | 0.205 | 1.8 | Hard, lustrous |
| 3 | 0.64 | 2.11 | 0.410 | 2.2 | Hard, lustrous surface |
| 4 | 0.67 | 2.36 | 0.595 | 1.0 | Friable |
| 5 | 0.76 | 2.70 | 0.794 | 0.7 | Very friable |

EXAMPLE 3

A series of foams was prepared by the method of example 1 using the partially cured resin of example 1 and varying the glyoxal concentration in the cross-linking solution. The density of the foams was increased by reducing the amount of air below that used in example 2. The weight ratio of partially cured resin to cross-linking agent was maintained at about 1.0. Sample cubes were evaluated as in example 2. The results of these evaluations are listed as follows:

| Test No. | Dry Density lbs/ft$^3$ | Ratio Aldehyde Moieties to Urea Molecules | Ratio Aldehyde Moieties in Glyoxal to Aldehyde Moieties in Formaldehyde | Yield Point of Foam lbs/In$^2$ |
|---|---|---|---|---|
| 1 | 1.07 | 1.48 | 0.0 | 1.2 |
| 2 | 0.98 | 1.69 | 0.253 | 2.4 |
| 3 | 1.05 | 1.85 | 0.372 | 2.9 |
| 4 | 1.11 | 2.42 | 0.794 | 0.8 |

EXAMPLE 4

A partially cured urea-formaldehyde resin was prepared by the method example 1, and at the completion of the preparation, 40% aqueous glyoxal was added in the amount of 0.20 aldehyde moieties per mol of formaldehyde in the resin. The cross-linking solution was made by the method of example 1, except that no dialdehyde was added. A foam was prepared by the method of example 1 the day following the preparation of the partially cured resin. The yield point of this foam was 1.0 pounds per square inch compared to 1.8 pounds per square inch for the product of example 1. The partially cured resin was stored at ambient temperature for 7 days, and used to produce foam again by the method of example 1. The foam collapsed and would not harden without the addition of large amounts of acid to the cross-linking solution. Foams produced from the stored resin using the acid required for hardening were highly friable, low in structural strength, and generally unsuitable for use. Inspection of the resin showed that the glyoxal had reacted with the partially cured urea-formaldehyde resin during storage to deactivate it and had caused precipitation of some of the urea-aldehyde polymer.

In a comparative test, using the foaming system of example 1 where the glyoal was added to the cross-linking solution, the partially cured urea-formaldehyde solution and the cross-linking solution were stored separately for 90 days at ambient temperature. These ingredients were then foamed by the method, conditions, and ratios of example 1. Dry foam density was 0.63 pounds per cubic foot, and structural strength was indicated by an average yield point measurement of 1.8 pounds per square inch.

EXAMPLE 5

A sample of the urea-aldehyde foam from example 1 was cut into a cube having 4 inch sides and dried for 5 days at ambient temperatures, of about 20° to 25° C, and then placed in a closed glass container fitted with nozzles for the introduction and discharge of air streams. Air was passed at a rate of 10 milliliters per minute over the test foam cube after first passing through a Haberman type bubbler containing a small amount of distilled water at ambient temperature. The air leaving the test cube was passed through another Haberman bubbler containing 50 ml of 1 per cent aqueous hydroxylamine hydrochloride to absorb any aldehyde carried from the test cube, convert the aldehyde to the corresponding oxime and produce an equivalent amount of free hydrochloric acid. The passage of air over the test block and through a parallel blank system, was continued for 7 days. The test and blank hydroxylamine solutions were then titrated with 0.05 normal potassium hydroxide to determine hydrochloric acid liberated and from that number, the amount of aldehyde, as formaldehyde, which was stripped from the test foam cube. The aldehyde recovered was about 0.1 milligram, amounting to 1 ppm or less aldehyde concentration in the total air passed over the cube in the test.

Another test cube was made by the procedure of example 1 except that the glyoxal content was replaced by an equal amount of formaldehyde. The 7 day air passage test showed that 1.44 milligrams of aldehyde, as formaldehyde, was removed from the test cube, indicating an average aldehyde concentration in the air of slightly more than 10 parts per million.

EXAMPLE 6

To a 4-liter capacity beaker was added 40 grams of cross-linking solution having the following composition:

| Component | Wt % |
| --- | --- |
| Suberic Aldehyde | 6.5 |
| Nacconal SZA (80% alkyl benzene sulfonic acid) | 2.0 |
| Sulfuric Acid | 0.6 |
| Water | 90.9 |

The cross-linking solution was beat to a light froth using a kitchen type blender set on high speed, and the blender was then set to medium speed. To the frothed cross-linking solution was slowly added 30 grams of the partially cured urea-formaldehyde resin from example 1. Medium speed blending was continued for 15 seconds after the resin addition and the blender was withdrawn from the foam. Molecular ratio of total aldehyde moieties to urea was 1.65 and ratio of aldehyde moieties in suberic aldehyde to formaldehyde was 0.21.

The foam was set to the point of self support in the beaker within 45 seconds. The foam remained in the beaker for 7 days to complete curing. The foam sample was then removed from the beaker and allowed to dry for 7 days at ambient room conditions. Density of the dried foam sample was 1.12 pounds per cubic foot. Yield point of the foam was 2.7 pounds per square inch and the foam was somewhat more flexible than the product of example 1.

EXAMPLE 7

A partially cured aqueous urea-formaldehyde resin was prepared by adding at ambient temperature to a closed, stirred, jacketed glass round bottom flask, fitted with a reflux condenser, and having 2 liters volume capacity, the following ingredients: 340 grams water, 412 grams crystal urea, and 695 grams 50% aqueous uninhibited formaldehyde. The mixture was heated to 97° C at pH 7.4 and treated with dilute formic acid to decrease pH to 5.8, and temperature rose to 100° C and then held between 94° and 100° C for 30 minutes. The temperature was decreased to 55° C and the following ingredients were added : 100 grams water and 53 grams urea with continued agitation. The mixture was neutralized to pH 7.1 by addition of triethanolamine and cooled to ambient temperature while continuing the agitation. Chemical solids calculated were 50.8%, and formaldehyde to urea molecular ratio was 1.5.

A cross-linking solution was prepared by adding 2 grams of ammonium chloride catalyst to 100 grams 40% aqueous glyoxal solution.

The partially cured resin was thoroughly blended with a mixture of hardwood chips passing a Tyler 3 mesh screen, to give a mixture containing 10% partially cured urea-formaldehyde resin. This mixture was formed into three mats which were then sprayed evenly with the cross-linking solution amounting to 13.2% of the urea-formaldehyde resin on the hardwood chips. The molecular ratio of glyoxal, as aldehyde moieties, to formaldehyde was 0.24 and the molecular ratio of total aldehyde moieties to urea was 1.85.

The treated mat of mixed hardwood chips was then pressed at 350 pounds per square inch pressure and 160° C for 45 minutes. The cure was halted on one of the mats after 10 minutes at 160° C, and 20 grams of the mat material was removed and stirred into 100 ml distilled water. pH was determined to be 4.5 on that sample. Strong, hard surfaced particle boards were obtained with the other two mats. Free formaldehyde analysis showed less than 1 part per million in both boards.

EXAMPLE 8

A partially cured urea-formaldehyde foam resin was prepared by the method of example 7 to the same 1.85 overall aldehyde moiety ratio. No cross-linking solution was sprayed on the mat of mixed hardwood chips before pressing. Objectionable formaldehyde odor was emitted from the press during the preparation of the board at the same conditions of example 7. Free formaldehyde analysis of the completed board showed 35 parts per million.

EXAMPLE 9

A contiguous mass of the foam produced in example 1, was pumped directly from the foam blending machine into vented hollow rectangular panels 8 feet long, 4 feet wide, and 2 inches deep, composed of aluminum sheets 1/16 inch thick tacked over a perimeter frame of 2 inch by 2 inch pine boards. After curing and drying for 10 days the panels were rigid enough for use as an outside wall surface on a utility building. Density of the dry foam in the panels was found to be 0.87 pounds per cubic foot.

The same type of operation was used to apply the foam of example 1 to filling hollow core interior doors. The foam increased the sound resistance and the stiffness of the door significantly from that of the regular "egg crate" carboard filled doors made with ¼ inch thick wood skins.

I claim:

1. An improved process for producing stable urea-aldehyde insulating foams having properties of improved structural strength and low formaldehyde vapor emission, from two separate storable liquids, said process comprising: blending an air-foamed solution containing dialdehydes having two to eight molecular carbons, surfactant, and mineral acid, with a partially cured aqueous urea-formaldehyde resin containing between 1.3 and 1.5 mols of formaldehyde per mol of urea and about 50 percent total solids, so that the molecular aldehyde moieties supplied by the dialdehyde are between 0.2 and 0.4 times the number of aldehyde moieties supplied by formaldehyde, and the molecular ratio of total aldehyde moieties to urea is between 1.7 and 2.0; curing and drying the blended fluids at a pH between 2.0 and 3.5 at ambient conditions until the foam hardens.

2. The process of claim 1 wherein dipropylene glycol, sorbitol, or polyethylene glycols, are added to the partially cured resin solution.

3. The process of claim 1 wherein attapulgite clay, or colloidal silica are added to the aqueous dialdehyde solution.

4. The process of claim 1 wherein the blended urea-aldehyde foam is applied as contiguous mass into a thin-skinned container to harden into a structural member.

* * * * *